US008461502B2

(12) United States Patent
Gianordoli et al.

(10) Patent No.: US 8,461,502 B2
(45) Date of Patent: Jun. 11, 2013

(54) METHOD AND DEVICE FOR CONTROLLING THE LIGHT POWER EMITTED BY AN LED LIGHT SOURCE

(75) Inventors: Stefan Gianordoli, Fürstenfeld (AT); Stefan Holzinger, Vienna (AT)

(73) Assignee: Continental Automotive GmbH, Hannover (DE)

( * ) Notice: Subject to any disclaimer, the term of this patent is extended or adjusted under 35 U.S.C. 154(b) by 402 days.

(21) Appl. No.: 12/679,328

(22) PCT Filed: Sep. 16, 2008

(86) PCT No.: PCT/EP2008/062271
§ 371 (c)(1),
(2), (4) Date: May 12, 2010

(87) PCT Pub. No.: WO2009/040266
PCT Pub. Date: Apr. 2, 2009

(65) Prior Publication Data
US 2010/0294914 A1 Nov. 25, 2010

(30) Foreign Application Priority Data

Sep. 21, 2007 (DE) .......................... 10 2007 045 259

(51) Int. Cl.
*G01J 1/32* (2006.01)
(52) U.S. Cl.
USPC ........................................................ 250/205
(58) Field of Classification Search
USPC ............................................ 250/205, 214 R
See application file for complete search history.

(56) References Cited

U.S. PATENT DOCUMENTS

| 4,476,238 A | 10/1984 | Palmer et al. ................... 502/31 |
| 8,159,144 B2* | 4/2012 | Behr et al. ..................... 315/291 |
| 2005/0007035 A1 | 1/2005 | Sloan et al. .................... 315/291 |
| 2005/0030628 A1* | 2/2005 | Wagner et al. ................. 359/573 |
| 2005/0201756 A1* | 9/2005 | Inglese et al. ................. 398/106 |
| 2006/0119489 A1* | 6/2006 | Shinada et al. ............... 340/901 |
| 2007/0058170 A1 | 3/2007 | Lodder ........................ 356/445 |

FOREIGN PATENT DOCUMENTS

| DE | 3220226 | 12/1982 |
| EP | 1562406 | 8/2005 |
| EP | 1562406 A1 | 8/2005 |
| EP | 1635617 | 3/2006 |
| EP | 1562046 B1 | 3/2008 |
| WO | 2004/057923 | 7/2004 |
| WO | 2004/105444 | 12/2004 |
| WO | 2004105444 | 12/2004 |
| WO | WO 2006063552 A1 * | 6/2006 |

OTHER PUBLICATIONS

International Search Report and Written Opinion for Application No. PCT/EP2008/062271 (13 pages), Jan. 5, 2009.

* cited by examiner

*Primary Examiner* — Thanh Luu
(74) *Attorney, Agent, or Firm* — King & Spalding L.L.P.

(57) ABSTRACT

In a method and a device for detecting the light power emitted by an LED light source, the LED light source is driven with a drive signal corresponding to a binary code. The light emitted by the LED light source is detected by means of a sensor system. The output signal of the sensor system is evaluated in a control and regulating unit. The LED light source is driven with a binary code having an irregular bit sequence.

24 Claims, 3 Drawing Sheets

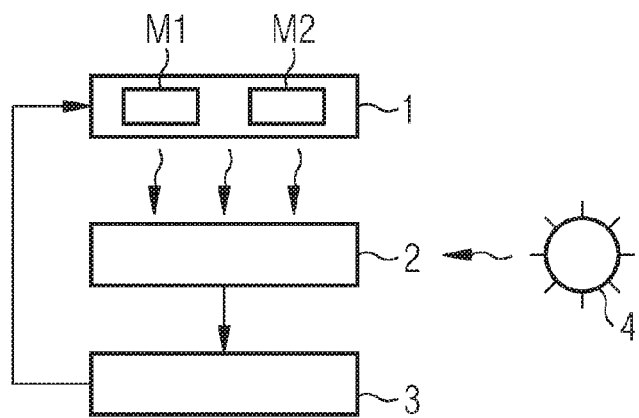
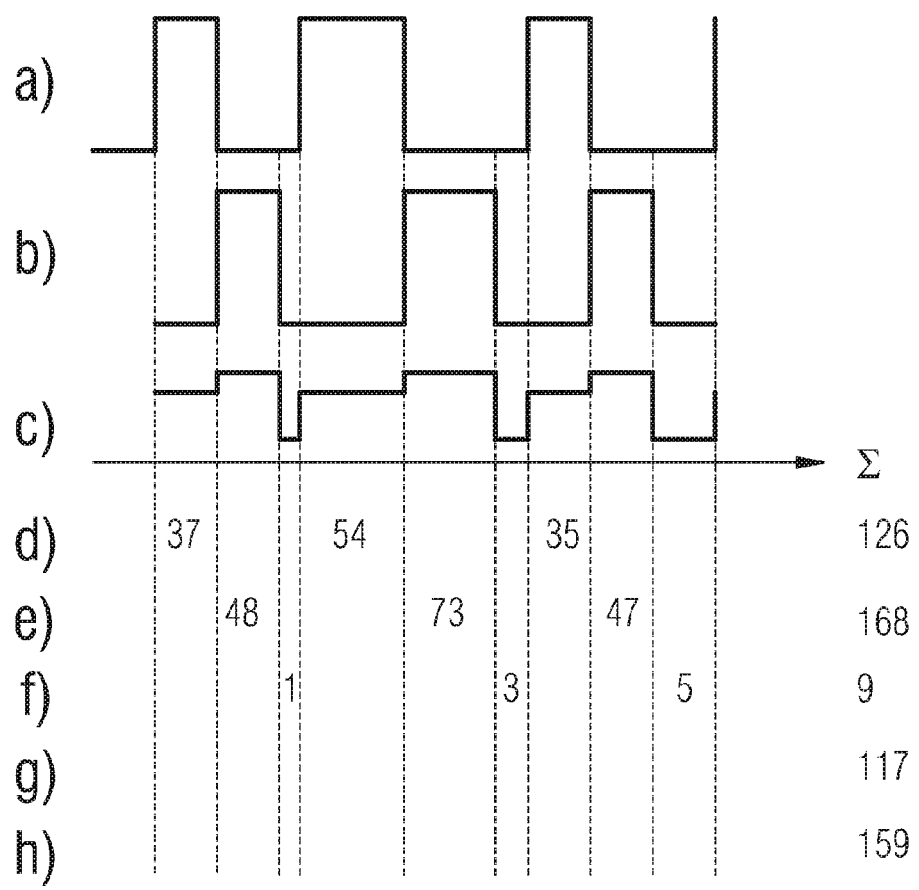

METHOD AND DEVICE FOR CONTROLLING THE LIGHT POWER EMITTED BY AN LED LIGHT SOURCE

CROSS-REFERENCE TO RELATED APPLICATIONS

This application is a U.S. National Stage Application of International Application No. PCT/EP2008/062271 filed Sep. 16, 2008, which designates the United States of America, and claims priority to German Application No. 10 2007 045 259.6 filed Sep. 21, 2007, the contents of which are hereby incorporated by reference in their entirety.

TECHNICAL FIELD

The invention relates to a method and a device for detecting the light power emitted by an LED light source. It can be used for example in conjunction with LED headlights in the automobile industry, in conjunction with street lighting, in conjunction with the lighting of halls, in conjunction with the lighting of retail premises and wherever an even appearance of the lighting from a number of light sources is required.

BACKGROUND

LEDs, especially high-power LEDs, have been subject to rapid development in recent years, in particular the light yield produced as a function of a predetermined control signal has sharply increased. White LEDs have now become so mature that they can be used in the automotive industry as a light source for the front headlights.

For motor vehicle manufacturers it is important to be able to guarantee that these LEDs can be replaced, for replacing defective LED for example. In such cases account must be taken of the fact that the development of LEDs is advancing all the time, that future LEDs can already provide the respective light power needed with smaller activation currents and that the brightness of a headlight should match before and after the LEDs have been exchanged.

It is already known that the number of LEDs can be combined into one or more LED modules or LED arrays in a headlight in order to provide the light power required in each case. Future LED arrays are likely to require fewer LEDs in order to generate the light power needed.

Furthermore it is already known that the light power radiated from an LED light source can be detected by means of a sensor system and the control current for the LED light source can be increased as a function of the output signals of this sensor system, in order for example to counter an ageing-related power reduction of the LED light source.

An automatic headlight regulating device for a motor vehicle is known from DE 102 42 864 A1 with a least one headlight featuring at least one light source. This regulating device is connected to an evaluation of electronics coupled to sensors and to control electronics adjusting at least one of a number of light distributions of the light source. These control electronics regulate the light distribution of the light source as a function of a command of the evaluation of electronics. At least one of the sensors is embodied as at least one light emitting diode assigned to the headlight for measuring the brightness of incident light.

A lighting device provided in particular for motor vehicles is known from DE 102 48 238 A1. This lighting device contains a diode arrangement comprising a number of light emitting diodes and a scattering disk or the like which lets through part of the light emitted by the light emitting diode arrangement and reflects part back to the light emitting diode arrangement. The light emitting diode arrangement is assigned to a control and/or evaluation unit. The diodes of the light emitting diode arrangement can be activated by this unit so that a respective diode is driven alternately as a light emitting diode and as a photodiode. In this case in each phase at least one diode respectively is driven as a light emitting diode and at least one diode as a photodiode. The output signal of the respective diode driven as a photodiode is fed to the control and or evaluation unit.

A motor vehicle lighting module is known from DE 103 13 24 6 A1. This features individual LEDs as lighting means, a basic chassis for retaining the LEDs, a sensor for detecting outer and/or inner influences during operation of the LEDs and/or manufacturing-technology-related characteristics of the LEDs, a data memory for the detected data and electronics for controlling and regulating the LEDs as a function of the detected influences and/or characteristics.

A sensor device, a use of a sensor device and a motor vehicle light are known from DE 10 2004 038 422 B3. This sensor device features a least one transmission unit arranged inside a sensor carrier and at least one receiver unit assigned to the transmitter unit arranged inside the sensor body as well as a test surface arranged between the transmitter unit and a receiver unit. The transmitter unit and/or the receiver unit are embodied from a molded part with an inserted radiation transmitter and/or the radiation receiver. The test surface is formed by an exit surface of the transmitter unit and an entry surface of the receiver unit.

A multifunction light sensor for a motor vehicle is known from EP-B1-0 910 525, which is intended for detection of a plurality of ambient conditions of the motor vehicle. The output signals of the sensor are used to control devices of the motor vehicle, for example the windows, the sliding roof, a ventilator or the screen washer of the motor vehicle. These are controlled with a periodic control signal of a predetermined frequency. The light emitted by the LED light source is evaluated using a phase-sensitive amplifier in accordance with the lock-in method.

SUMMARY

According to various embodiments, an improved method and an improved device for detecting the light power emitted by an LED light source can be specified.

According to an embodiment, a method for detecting light power emitted by an LED light source, may comprise the following steps:
  Controlling the LED light source with control signals corresponding to a binary code,
  Detecting the light emitted by the LED light source by means of a sensor system and
  Evaluating the measurements signals provided by the sensor system in a control and regulating unit characterized in that
  the LED light source is driven by a binary code having an irregular bit sequence.

According to a further embodiment, the measurement signal provided by the sensor system is evaluated in the control and regulating unit in accordance with the lock-in method. According to a further embodiment, the LED light source can be driven by control signals which correspond to the RC5 code. According to a further embodiment, the LED light source may comprise a number of LED modules which are each driven by a binary code having an irregular bit sequence. According to a further embodiment, the LED modules can be driven simultaneously by different control signals which each correspond to a binary code having an irregular bit sequence. According to a further embodiment, the LED modules can be driven with a time offset by different control signals which each correspond to a binary code having an irregular bit sequence. According to a further embodiment, the LED modules can be driven with a time overlap by different control signals which each correspond to a binary code having an irregular bit sequence. According to a further embodiment, the sensor system may comprise a single sensor. According to a further embodiment, the sensor system may comprise a plurality of sensors. According to a further embodiment, the control and regulating unit may comprise a number of microprocessors arranged in one or in different headlights which are connected to each other via a bus. According to a further embodiment, the LED modules may belong to different headlights and the different headlights can be driven at the same time by control signals of a different frequency. According to a further embodiment, the LED modules may belong to different headlights which can be driven synchronized, with one headlight being controlled in each case during the off times of the other headlight or headlights respectively. According to a further embodiment, the LED modules may belong to different headlights and the different headlights can be driven overlapping in time.

According to another embodiment, a device for detecting light power emitted by an LED light source, may comprise an LED light source, a sensor system for detection of the light power emitted by the LED light source, a control and regulating unit coupled with the sensor system for evaluating the measurement signal, wherein for controlling the LED light source, the control and regulating unit is provided with a binary code having an irregular bit sequence.

According to a further embodiment of the device, the control and regulating unit may evaluate the measurement signals provided by the sensor system in accordance with a lock-in method. According to a further embodiment of the device, the control and regulating unit provides control signals corresponding to the RC5 code for the LED light source. According to a further embodiment of the device, the LED light source comprises a number of LED modules. According to a further embodiment of the device, the control and regulating unit may control the LED modules simultaneously with different control signals which each correspond to a binary code having an irregular bit sequence. According to a further embodiment of the device, the control and regulating unit may control the LED modules with a time offset with different control signals which each correspond to a binary code having an irregular bit sequence. According to a further embodiment of the device, the control and regulating unit may control the LED modules with a time overlap with different control signals which each correspond to a binary code having an irregular bit sequence. According to a further embodiment of the device, the sensor system may comprise a single sensor. According to a further embodiment of the device, the sensor system may comprise a plurality of sensors. According to a further embodiment of the device, the control and regulating unit may comprise a number of microprocessors arranged in one or in different headlights which are connected to each other via a bus. According to a further embodiment of the device, the LED modules may be components of different headlights. According to a further embodiment of the device, the control and regulating unit may control the different headlights simultaneously with control signals of a different frequency. According to a further embodiment of the device, the control and regulating unit may be designed for synchronized control of the different headlights, with one headlight in each case being controlled during the off times of the further headlight or headlights. According to a further embodiment of the device, the control and regulating unit can be designed for overlapping control of the different headlights.

BRIEF DESCRIPTION OF THE DRAWINGS

Further advantageous characteristics of the invention emerge from the explanation of examples which refer to the figures.

The figures show.

DETAILED DESCRIPTION

Advantages of the various embodiments lie particularly in the evaluation security being increased because of the claimed binary code of the activation signals featuring an irregular bit sequence. Furthermore the light power of a number of different headlights can be detected for measurement purposes within a short time by the bit sequences or different binary codes being applied to the headlights or by the headlights being controlled synchronized in the sense of that a headlight is controlled in the off times of the other headlight or headlights and vice versa.

Figure 1:
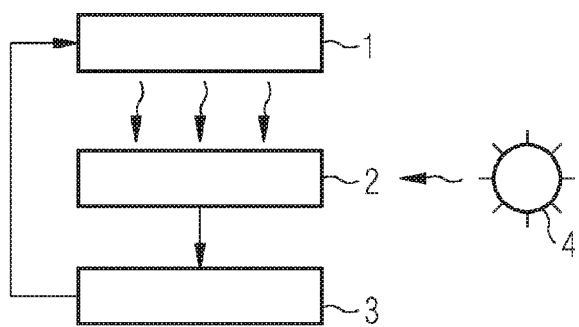
FIG. 1 a block diagram of a device for detecting light power emitted by an LED light source in accordance with a first exemplary embodiment for the invention, FIG. 2 a diagram to explain the control signals used for the first exemplary embodiment, FIG. 3 a block diagram of a device for detecting the light power emitted by an LED light source in accordance with a second exemplary embodiment for the invention, FIG. 4 a diagram to explain the control signals used for the second exemplary embodiment, FIG. 5 a block diagram of a device for detecting the light power emitted by an LED light source in accordance with a third exemplary embodiment for the invention, FIG. 6 a block diagram of a device for detecting the light power emitted by an LED light source in accordance with a fourth exemplary embodiment for the invention.

FIG. 1 shows the block diagram of a device for detecting the light power emitted by an LED light source in accordance with a first exemplary embodiment.

The device depicted has a control and regulation unit 3 which is formed by a microcomputer. This makes available at its output control signals for an LED light source 1. The LED light source 1 emits light. For detection of the light power emitted by the LED light source a sensor arrangement 2 is provided. This also detects the light power caused by one or more ambient light sources 4. The output signals of the sensor arrangement 2 are fed to the control and regulation unit 3, evaluated in this unit and converted into control signals for the LED light source 1.

Signals which correspond to a binary code having an irregular bit sequence are used as control signals, preferably signals which correspond to the RC5 code. This code has a total of 14 bits which are transmitted one after the other. These include two start bits, a toggle bit which alternately assumes the value 1 or 0, five address bits which specify the LED light source and six command bits. This code is converted in the LED light source into light signals, of which the light power is dependent on the command bits.

The control and regulation unit 3 evaluates the measurement signals provided by the sensor arrangement in accordance with the lock-in method. In this method the evaluation is undertaken in relation to the frequency and the phase to match the control signals such that the proportion of the received light power to be fed back to the ambient light source 4 is calculated from the output signals of the sensor arrangement. The remaining signal which provides information about the light power output by the LED light source 1 is compared in the control and regulation unit 3 with one or more predetermined reference values and converted into control signals for the LED light source 1. This evaluation enables the light power of the LED light source 1 to be regulated to a predetermined value.

Figure 2:
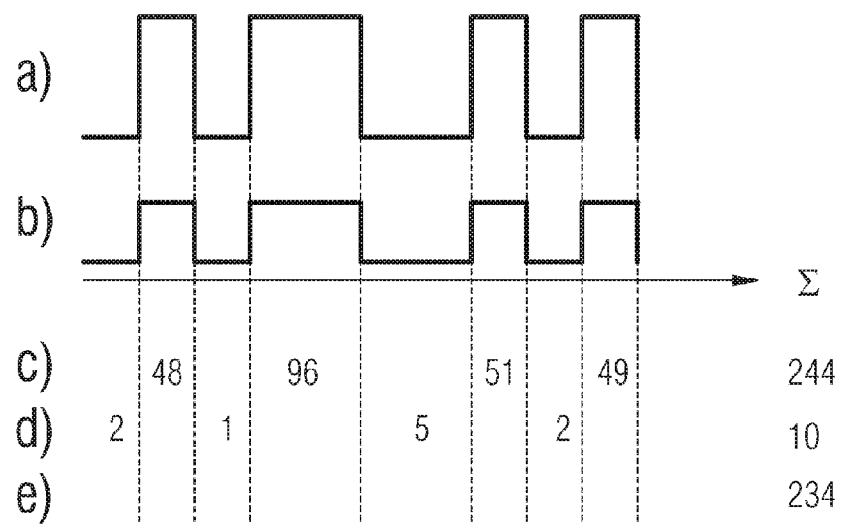

FIG. 2 shows a diagram to explain a control signal and the principal of the evaluation of the light signals emitted by the LED light source 1. In this case the control signal output by the control and regulation unit 3 is shown in FIG. 2a, which involves a binary code featuring an irregular bit sequence. Shown in FIG. 2b is the measurement signal detected by the sensor arrangement which is based on the light emitted by the LED light source 1 and on the light emitted by the ambient light source 4. Numerical values are given in FIG. 2c which depend on the amplitude of the measurement signal and which were detected during the on states of the control signal. FIG. 2d shows numerical values which also depend on the amplitude of the measurement signal but which are detected during the off states of the control signal. At the right-hand end of FIG. 2c a numerical value is specified which corresponds to the sum of the further numerical values of FIG. 2c. At the right-hand end of FIG. 2d a numerical value is specified which corresponds to the sums of the further numerical values of FIG. 2d. If the numerical value at the right-hand end of FIG. 2d is subtracted from the numerical value at the right-hand end of FIG. 2c then the numerical value specified at the right-hand end of FIG. 2e is obtained. This subtraction process calculates the proportion of the light power detected by the sensor arrangement 2 based on the ambient light source 4 from the light power detected overall by the sensor arrangement 2. The numerical value specified in FIG. 2e consequently provides the desired information about the light power emitted by the LED light source 1.

The principal of evaluation described above only functions if the on and off states of the control signals are the same length. If this is not the case a weighting of the numerical values must be carried out before the subtraction.

The information about the light power emitted by the LED light source 1 is compared in the control and regulation unit 3 with predetermined reference values and converted into control signals for the LED light source 1. These control signals ensure that the LED light source 1 always emits light signals of a desired predetermined light power. This regulation process can compensate for factors such as an ageing-related drop-off in the light power emitted by the LED light source. Furthermore a failure of the LED light source 1 can be detected by a comparison with a predetermined reference value.

The use of a binary code featuring an irregular bit sequence as the control signal has the advantage of there being no restrictions in relation to the basic frequency of the control signal. Even if the basic frequency of the control signal collides with the usual network frequency or a harmonic thereof at the point of application, it is possible because of the use of a binary code featuring an irregular bit sequence to separate the proportion of the overall light power received by the sensor arrangement 2 going back to the LED light source 1 and to provide this proportion with corresponding control signals for the LED light source 1. Furthermore the use of a binary code featuring an irregular bit sequence as a control signal also provides the opportunity of detecting the light power of a number of LED modules or LED arrays of an LED light source within a short time. Furthermore the use of a binary code featuring an irregular bit sequence as a control signal also provides the opportunity of detecting the light power of a number of different headlights within a short period. Exemplary embodiments of this are explained on the basis of the further figures.

FIG. 3 shows a block diagram of a device for detecting the light power emitted via an LED light source 1 in accordance with a further exemplary embodiment. This second exemplary embodiment differs from the first exemplary embodiment shown in FIG. 1 in that the light source features a number of LED modules or LED arrays. With the exemplary embodiment shown in FIG. 3 the LED light source 1 features two LED modules M1 and M2. Each of these LED modules contains a predetermined number of LEDs, for example six LEDs or four LEDs. The number of LEDs of the LED module M2 can be equal to the number of LEDs of LED module M1 but can also differ from it.

For measurement of the light power emitted overall by the LED modules M1 or M2 as well as the LED light source 1, the LED modules M1 and M2 are controlled by the control and regulating unit 3 in each case with a binary code featuring an irregular bit sequence.

This control is illustrated in FIGS. 4a and 4b. FIG. 4a shows an example of a control signal for the LED module M1. FIG. 4b shows an example of a control signal for the LED module M2. It can be seen from FIGS. 4a and 4b that during the on time segments of the control signal for the LED module M1, the control signal for the LED module M2 is in the off state and vice versa. Furthermore it is evident that there are also segments in which two control signals are in the off state.

The light signals emitted by the LED modules M1 and M2 are detected by a sensor system 2 common to the two LED modules M1 and M2. This sensor system also detects a light power caused by an ambient light source of 4. The output signals of the sensor system 2 are evaluated in the control and regulating unit 3 and converted into control signals for the LED modules M1 and M2, with these LED modules, as is already evident from FIGS. 4a and 4b, being controlled individually one after the other.

The signals detected by the sensor system 2, which also include the light power caused by the ambient light source 4, are shown in FIG. 4c. These signals are evaluated in the control and regulating unit 3 in accordance with the lock-in method. Since the control and regulating unit 3 knows the frequency and phase position of the control signals fed to the LED modules M1 and a2, the control and regulating unit 3 is then in a position to separate the light power belonging to the respective LED module M from the received signal or to calculate it from said signal.

This is illustrated in FIGS. 4d to 4h. In FIG. 4d numerical values are specified which depend on the amplitude of the measurement signal and are detected during the on states of the control signal for the LED module M1. FIG. 4e shows numerical values which are likewise dependent on the amplitude of the measurement signal but are detected during the on states of the control signal for the LED module M2. In FIG. 4f numerical values are specified which are detected in the time segments in which both control signals are in the off state. At the right-hand end of FIG. 4d a numerical value is specified which corresponds to the sum of the further numerical values of FIG. 4d. At the right-hand end of FIG. 4e a numerical value is specified which corresponds to the sum of the further numerical values of FIG. 4e. At the right-hand end of FIG. 4f a numerical value is specified which corresponds to the sum of the further numerical values of FIG. 4f.

If the numerical value at the right-hand end of FIG. 4f is subtracted from the numerical value at the right-hand end of FIG. 4d, the numerical value at the right-hand end of FIG. 4g is obtained. If the numerical value at the right-hand end of FIG. 4f is subtracted from the numerical value at the right-hand end of FIG. 4e, the numerical value at the right-hand end of FIG. 4h is obtained. Through these subtraction processes the component of the light power detected by the sensor system 2 based on the ambient light source 4 is calculated from the total light power detected by the sensor system. Consequently the numerical value specified in FIG. 4g provides the desired information about the light power emitted by LED module M1 and the numerical value specified in FIG. 4h provides the desired information about the light power emitted by LED module M2.

The principal described above also only functions here if the on and off states are of the same size. If this is not the case then a weighting of the numerical values is to be undertaken before the subtraction. A weighting is furthermore also needed if the light sources are not 100% switched on.

Figure 5:
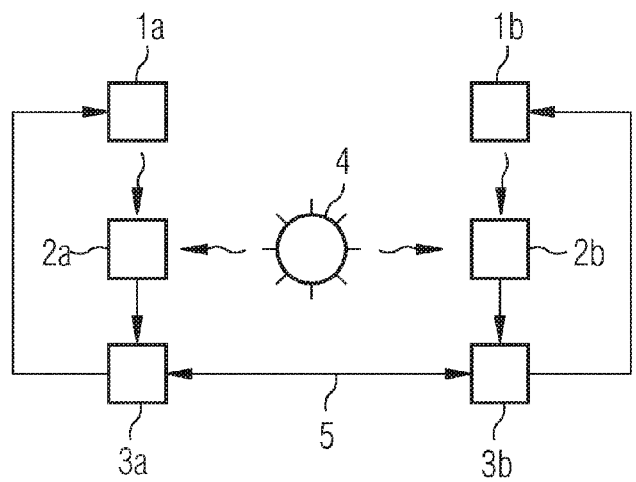

FIG. 5 shows a block diagram of a device for detecting the light power emitted by an LED light source in accordance with a third exemplary embodiment. In this exemplary embodiment two LED light sources 1a and 1b provided to each of which is assigned a separate sensor system 2a or 2b and also in each case a separate control and regulating unit 3a or 3b. The two control and regulating units 3a and 3b are connected to each other via a data bus 5, for example a CAN bus or a proprietary bus and exchange information with each other via this data bus. Because of this connection of the two control and regulating units 3a and 3b it is possible for example to regulate the light power of the LED light sources 1a and 1b such that the light power emitted by these LED light sources matches. Furthermore there can also be communication with the outside world via the data bus, typically with the control and regulating units of further LED light sources or with external control devices.

The LED light sources shown in FIG. 4 are controlled as in the exemplary embodiments described above by control signals which correspond to a binary code having an irregular bit sequence. The measurement signals provided by the respective sensor systems are likewise evaluated in accordance with the lock-in method.

The LED light sources 1a and 1b are typically two different headlights which are used for illuminating a space.

These two headlights can be controlled at the same time with control signals of a different basic frequency. This simultaneous control means that the desired measurement results are rapidly available and regulating measures can be instigated within a very short time which balance the light power emitted by the two headlights.

As an alternative the two headlights can also be controlled or synchronized in the sense that one headlight in each case is controlled during the off times of the respective other headlight. This method of operation also allows a rapid regulation to remove differences in brightness between the two headlights.

Furthermore there is also the opportunity of controlling the two headlights with a time overlap, as a result of this overlapping the sensor system detects an overlaid signal. Since however this is known to the control and regulating unit this unit can separate the proportions attributable to the different sources from each other.

Figure 6:
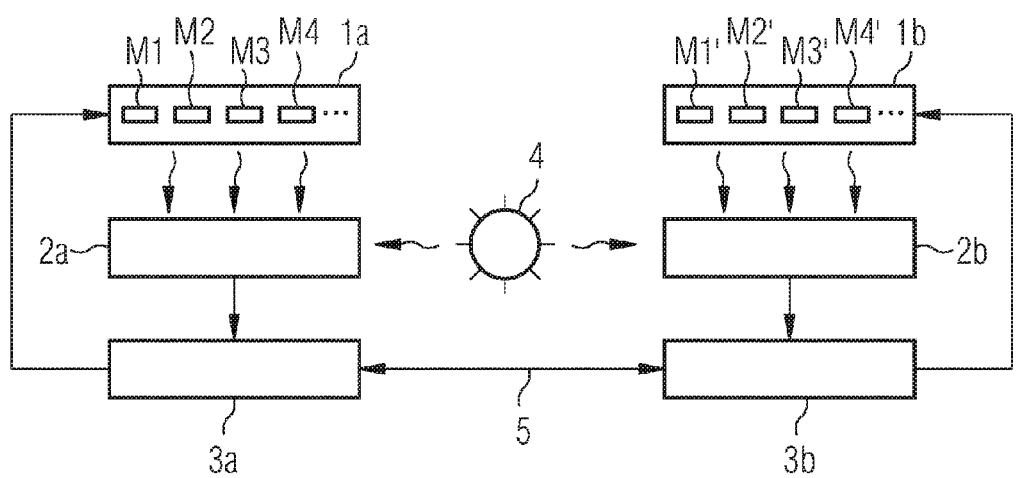

FIG. 6 shows a block diagram of a device for detecting the light power emitted by an LED light source in accordance with a fourth exemplary embodiment. In this exemplary embodiment two light sources 1a and 1b are provided which typically involve the left-hand front headlight and the right-hand front headlight of a motor vehicle. The left-hand front headlight 1a features LED modules M1, M2, M3, M4, ..., which typically involve a dipped beam, a full beam, a daylight and a position light. The right-hand front headlight 1a features LED modules M1', M2', M3', M4', ..., which likewise involve a dipped beam headlight, a full beam, a daylight and a position light.

Modules M1, M2, M3 and M4 of the left-hand front headlight are assigned a common sensor system 2a and a common control and regulating unit 3a. Modules M1', M2', M3' and M4' of the right front headlight are assigned a common sensor system 2b and a common control and regulating unit 3b. The control and regulating units 3a and 3b are connected to each other via a data bus 5. This allows data to be exchanged for example on the basis of which the control and regulating units match the light power emitted by the dipped headlight module of the left-hand front headlight to the light power of the dipped headlight module of the right-hand front headlight etc. This is also possible if one of the dipped headlight modules has to be replaced and the new dipped headlight module contains technologically further developed, innovative light emitting diodes.

An alternative to the exemplary embodiment shown in FIG. 5 consists of assigning two sensors to the LED light sources 1a and 1b which each involve a headlight, with the sensors assigned to the LED light source 1a delivering their output signals to the control and regulating unit 3a and the sensors assigned to the LED light source 1b delivering their output signals to the control and regulating unit 3b.

The data bus 5 can also be coupled to external components in the exemplary embodiment shown in FIG. 6, so that the control and regulating units 3a and 3b are able to exchange data with external components.

The light emitted by the headlights 1a and 1b can advantageously be used for other purposes, for example for an automatic opening of the garage door which corresponds to the code used.

Furthermore there is the opportunity of transferring via the data bus the data corresponding to the ambient brightness to an external light control device.

The method described on the basis of the above exemplary embodiments advantageously makes possible a suppression or filtering out of pulse-shaped disturbance in the detection of the light power emitted by an LED light source. This is especially achieved by the use of a binary code having an irregular bit sequence as a control signal for the light source in conjunction with a lock-in method used during evaluation. Furthermore falsifications of the measurement results can be prevented which are based on the known inherent disturbers, for example a further light source in the same headlight housing. Such disturbances can be explicitly sampled out or compensated for. Furthermore the influence of known disturbers can be explicitly included in the evaluation.

The quality of the measurement results can be determined by average values being repeatedly calculated and checks being made as to how greatly the new measurement results deviate from calculated average values.

What is claimed is:

1. A method for controlling light power emitted by at least one LED light source, each LED light source comprising a plurality of LED modules, the method comprising:
controlling each LED module with control signals corresponding to a binary code having an irregular bit sequence;
detecting measurements of the visible light power emitted by each LED module using a sensor system comprising a single sensor per LED light source;

using a control and regulating unit to evaluate the measurements of the visible light power provided by the sensor system by calculating a visible light power emitted by each LED module; and adjusting operation of the LED modules based at least in part on the evaluation of the measurements of the visible light power to control the visible light power emitted by the at least one LED light source.

2. The method according to claim 1, wherein the evaluation of the measurement signal provided by the sensor system is performed in the control and regulating unit in accordance with a lock-in method.

3. The method according to claim 1, wherein each LED light source is driven by control signals which correspond to a RC5 code.

4. The method according to claim 1, wherein the LED modules are driven simultaneously by different control signals which each correspond to a binary code having an irregular bit sequence.

5. The method according to claim 1, wherein the LED modules are driven with a time offset by different control signals which each correspond to a binary code having an irregular bit sequence.

6. The method according to claim 1, wherein the LED modules are driven with a time overlap by different control signals which each correspond to a binary code having an irregular bit sequence.

7. The method according to claim 1, wherein the sensor system comprises a plurality of sensors, each arranged to detecting visible light power emitted by one of a plurality of LED light sources.

8. A method for controlling light power emitted by a plurality of LED light sources, each comprising at least one LED module, the method comprising:

controlling each LED light source with control signals corresponding to a binary code having an irregular bit sequence;

detecting measurements of the visible light power emitted by each LED light source using a sensor system comprising a single sensor per LED light source;

using a control and regulating unit to evaluate the measurements of the visible light power provided by the sensor system by calculating a visible light power emitted by each LED module;

comparing the calculated visible light power emitted by each LED module of each of the LED light sources; and if the calculated visible light power emitted by at least two of the plurality of LED modules assigned to different LED light sources differ from each other, automatically adjusting operation of at least one of the at least two LED modules such that visible light power emitted by the at least two LED modules matches each other.

9. The method according to claim 8, wherein each of the plurality of LED light sources is assigned to and disposed in a separate headlight of a vehicle.

10. The method according to claim 9, wherein the control and regulating unit comprises a plurality of microprocessors connected to each other via a bus and disposed in one or more of the headlights.

11. The method according to claim 9, wherein the LED modules associated with different LED light sources disposed in different headlights are driven at the same time by control signals of a different frequency.

12. The method according to claim 9, wherein the separate headlights containing the LED light sources are driven synchronized, with each headlight being controlled during the off times of the other headlight or headlights.

13. The method according to claim 9, wherein the separate headlights containing the LED light sources are driven overlapping in time.

14. A device for generating light, comprising:

a plurality of LED light sources, each comprising at least one LED module;

a sensor system for detection of the visible light power emitted by each LED light source, and comprising a single sensor per LED light source;

a control and regulating unit coupled with the sensor system and configured to:

control each of the LED modules with control signals corresponding to a binary code having in irregular bit sequence;

evaluate measurements of visible light power provided by the sensor system by calculating a visible light power emitted by each LED module;

compare the calculated visible light power emitted by each LED module of each of the LED light sources; and if the calculated visible light power emitted by at least two of the plurality of LED modules assigned to different LED light sources differ from each other, automatically adjusting operation of at least one of the at least two LED modules such that visible light power emitted by the at least two LED modules matches each other.

15. The device according to claim 14, wherein the control and regulating unit evaluates the measurement signals provided by the sensor system in accordance with the lock-in method.

16. The device according to claim 14, wherein the control and regulating unit provides control signals corresponding to a RC5 code for each LED light source.

17. The device according to claim 14, wherein the control and regulating unit controls the LED modules simultaneously with different control signals which each correspond to a binary code having an irregular bit sequence.

18. The device according to claim 14, wherein the control and regulating unit controls the LED modules with a time offset with different control signals which each correspond to a binary code having an irregular bit sequence.

19. The device according to claim 14, wherein the control and regulating unit controls the LED modules with a time overlap with different control signals which each correspond to a binary code having an irregular bit sequence.

20. The method according to claim 14, wherein each of the plurality of LED light sources is assigned to and disposed in a separate headlight of a vehicle.

21. The device according to claim 20, wherein the control and regulating unit comprises a plurality of microprocessors connected to each other via a bus and disposed in one or more of the separate headlights.

22. The device according to claim 20, wherein the control and regulating unit controls the different headlights simultaneously with control signals of a different frequency.

23. The device according to claim 20, wherein the control and regulating unit is configured for synchronized control of the different headlights, with each headlight being controlled during the off times of the other headlight or headlights.

24. The device according to claim 20, wherein the control and regulating unit is configured for overlapping control of the different headlights.

* * * * *